(12) United States Patent
Teshima et al.

(10) Patent No.: US 7,794,536 B2
(45) Date of Patent: Sep. 14, 2010

(54) METHOD FOR MANUFACTURING PIGMENT DISPERSION

(75) Inventors: Takayuki Teshima, Yokohama (JP); Tetsuo Hino, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 12/254,757

(22) Filed: Oct. 20, 2008

(65) Prior Publication Data

US 2009/0101044 A1 Apr. 23, 2009

(30) Foreign Application Priority Data

Oct. 22, 2007 (JP) .............................. 2007-274315

(51) Int. Cl.
*C09B 67/20* (2006.01)
*C09D 17/00* (2006.01)

(52) U.S. Cl. .................. 106/413; 106/412; 106/493; 106/497; 540/140; 540/141; 546/49; 546/56

(58) Field of Classification Search ................. 106/493, 106/497, 412, 413; 540/140, 141; 546/49, 546/56

See application file for complete search history.

(56) References Cited

U.S. PATENT DOCUMENTS

| 5,085,698 | A | | 2/1992 | Ma et al. | |
|---|---|---|---|---|---|
| 5,650,256 | A | * | 7/1997 | Veregin et al. | 430/137.14 |
| 5,679,138 | A | | 10/1997 | Bishop et al. | |
| 7,160,380 | B2 | * | 1/2007 | Maeta et al. | 106/493 |
| 7,427,322 | B2 | * | 9/2008 | Maeta et al. | 106/493 |
| 7,537,329 | B2 | * | 5/2009 | Nito et al. | 347/96 |
| 7,538,155 | B2 | * | 5/2009 | Maeta et al. | 524/700 |
| 7,557,150 | B2 | * | 7/2009 | Teshima et al. | 523/315 |
| 7,578,880 | B2 | * | 8/2009 | Sato et al. | 106/493 |
| 7,625,066 | B2 | * | 12/2009 | Teshima et al. | 347/43 |
| 2005/0109240 | A1 | * | 5/2005 | Maeta et al. | 106/493 |
| 2006/0125895 | A1 | * | 6/2006 | Nito et al. | 347/100 |
| 2006/0260510 | A1 | * | 11/2006 | Maeta et al. | 106/493 |
| 2007/0012221 | A1 | * | 1/2007 | Maeta et al. | 106/498 |
| 2007/0149651 | A1 | * | 6/2007 | Teshima et al. | 523/315 |
| 2007/0172589 | A1 | * | 7/2007 | Teshima et al. | 427/212 |
| 2009/0120325 | A1 | * | 5/2009 | Kyota et al. | 106/31.65 |
| 2009/0139430 | A1 | * | 6/2009 | Hino et al. | 106/31.6 |

FOREIGN PATENT DOCUMENTS

| JP | 4-29707 B | 5/1992 |
|---|---|---|
| JP | 5-27664 B | 4/1993 |
| JP | 6-33353 B | 5/1994 |
| JP | 6-96679 B | 11/1994 |
| JP | 9-176543 | 7/1997 |
| JP | 9-221616 | 8/1997 |
| JP | 2005-307154 | 11/2005 |

* cited by examiner

*Primary Examiner*—Anthony J Green
(74) *Attorney, Agent, or Firm*—Canon U.S.A., Inc., IP Division

(57) ABSTRACT

A method is provided for pigment dispersion. The method includes preparing a solution in which the pigment is dissolved in an organic acid, preparing a reaction liquid capable of decreasing the solubility of the pigment in the solution, and mixing the solution and the reaction liquid in the presence of an additive represented by a General Formula (1) below, $$C_mH_{2m+1}(OCH_2CH_2)_nOH \quad (1)$$

wherein m is an integer higher than 14 and lower than 18, and n is an integer equal to or higher than 15 and equal to or lower than 25.

8 Claims, 2 Drawing Sheets

METHOD FOR MANUFACTURING PIGMENT DISPERSION

BACKGROUND OF THE INVENTION

1. Field of the Invention

The present invention relates to a method for manufacturing a pigment dispersion.

2. Description of the Related Art

Agrochemicals such as herbicides and insecticides, drugs such as antitumor drugs, antiallergy drugs, and antiphlogistics, and coloring materials such as inks and toners having colorants are well known as functional materials for dispersion materials containing functional substances.

Among them, quinoline compounds are known as intermediates for agrochemicals and drugs and also as organic EL materials. Further, among them, quinacridone compounds are widely used as coloring materials and application thereof as pigments is known.

A remarkable progress has recently been made in the field of digital printing technology. Electrophotography and ink jet technology are representative examples of digital printing technology, and the presence of such technology as an image forming technology in offices and at home has become more noticeable in recent years.

Among these methods, ink jet technology as a direct recording method features compactness of equipment and low power consumption.

Further, miniaturization of nozzles has rapidly improved the image quality. In one of the methods representing ink jet technology, ink supplied from an ink tank is evaporated and bubbled by heating with a heater located in a nozzle, and the ink is ejected to form an image on a recording medium.

In another example, ink is ejected from a nozzle by inducing oscillations with a piezo element.

Aqueous solutions of dyes are often used as inks to be employed in such methods. As a result, bleeding can sometimes occur in the zones where colors overlap, or a phenomenon called feathering sometimes occurs in the paper fiber direction in the recording locations on the recording medium.

U.S. Pat. No. 5,085,698 discloses using a pigment dispersion ink to reduce bleeding and feathering.

However, in many cases, the pigment dispersion inks can be inferior to dye inks in terms of coloration ability. Thus, because pigment particles can cause light scattering and light reflection, the coloration ability of images formed by pigment inks can be inferior to that of the images obtained with dye inks.

Further, coarse pigment particles can cause nozzle clogging in the ink jet head. Decreasing pigment particles in size has been attempted to improve coloration ability and to reduce nozzle clogging.

Pigments reduced in size to 100 nm or less often demonstrate a low level of light scattering and have a large surface area. As a result, an improvement in coloration ability can be achieved.

Pigment dispersion inks are typically obtained by dispersing a water-insoluble pigment in an aqueous medium. This process may include the step of adding the pigment to an aqueous medium containing a dispersant, and then finely grinding in a dispersion apparatus such as a sand mill or a ball mill using hard beads.

However, in certain instances it may be difficult to obtain a fine and stable pigment dispersion with such a process. Japanese Patent Laid-Open No. 9-176543 discloses a method for obtaining a pigment particle dispersion with a particle size equal to or less than 100 nm by high-speed mill dispersion using beads. With this method a fine dispersion can be reliably obtained, but a large amount of energy may be required for the dispersion process and a complex process may be necessary to separate the dispersion liquid obtained and the beads.

On the other hand, a method for obtaining fine particles of a pigment by dissolving the pigment and then precipitating it again has been suggested. Japanese Patent Laid-Open No. 9-221616 suggests producing fine particles by an acid pasting method in which a pigment is dissolved using sulfuric acid, but such a method may not produce pigments with a particle size of 100 nm or less. Further, Japanese Patent Publication Nos. 4-29707 describes methods for obtaining fine pigment particles by dissolving a pigment in an aprotic polar solvent in the presence of a base and then neutralizing with an acid and precipitating the pigment.

However, because the particle size reduction of the pigment and dispersion stabilization treatment are not typically performed simultaneously, the pigment particles that are initially very small may start aggregating in the course of dispersion, and it is not always easy to obtain a pigment dispersion of essentially nanometric order.

In Japanese Patent Publication Nos. 5-27664, 6-96679, and 6-33353, fine pigment particles are obtained by dissolving a pigment together with a dispersant such as a surfactant or resin in an aprotic polar solvent in the presence of an alkali and then neutralizing with an acid and precipitating the pigment.

The pigments that are dissolved in these methods typically have poor solubility. Therefore, the amount of solvent necessary for dissolving the pigments may be relatively large and thus a high-concentration dispersion may not always be easy to produce. Using a large amount of organic solvent can also increase the production cost and also the cost of waste-water treatment. Further, although the dispersion obtained can be concentrated by vacuum distillation or ultrafiltration of the solvent, significant efforts and time may be required for obtaining a high-concentration dispersion. Therefore, room for improvement still exists.

Further, Japanese Patent Laid-Open No. 2005-307154 discloses a method for producing 2,9-dimethylquinacridone by synthesis using a capillary as a reactor.

In this synthesis reaction, a starting material is mixed with p-toluenesulfonic acid, which is solid at normal temperature, dimethylformamide, and ethylene glycol, the mixed solution is passed through a capillary heated in an oil bath, and 2,9-dimethylquinacridone is synthesized.

However, the p-toluenesulfonic acid, which is solid at normal temperature, can be difficult to pass through a capillary, and thus because a solvent is typically used, it is not always easy to obtain 2,9-dimethylquinacridone at a high concentration. Furthermore, in order to obtain 2,9-dimethylquinacridone using water as a dispersion medium, a phase transition to water may be necessary, and the concentration may be additionally decreased. When the synthesis is performed in the presence of a dispersant, there may also be the risk of the dispersant dissolving at a high temperature under acidic conditions, and the number of suitable dispersants may, therefore, be limited. According, there remains room for improvement.

SUMMARY OF THE INVENTION

According to an aspect of the present invention, a method for manufacturing a pigment dispersion includes: preparing a solution in which the pigment is dissolved in an organic acid; preparing a reaction liquid capable of decreasing the solubility of the pigment in the solution; and mixing the solution and the reaction liquid in the presence of an additive represented by a General Formula (1) below.

wherein, m is an integer higher than 14 and lower than 18, and n is an integer equal to or higher than 15 and equal to or lower than 25.

Further features of the present invention will become apparent from the following description of exemplary embodiments with reference to the attached drawings.

DESCRIPTION OF THE INVENTION

Figure 1:
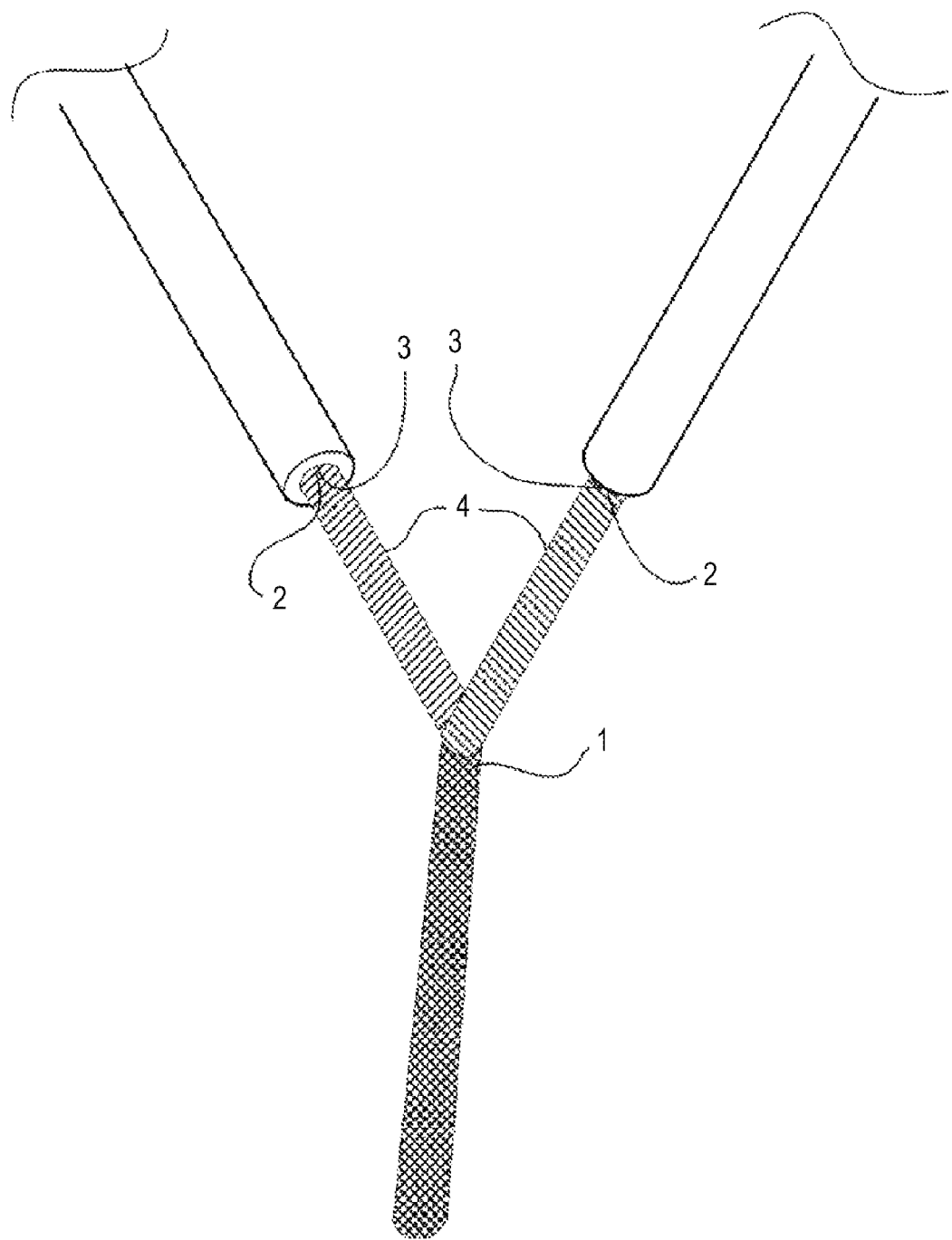
FIG. 1 shows schematically a microchannel that can be used in Example 1 of the present invention.

In one embodiment of the present invention, the method includes preparing a solution in which the pigment is dissolved in an organic acid; preparing a reaction liquid that is capable of decreasing the solubility of the pigment in the solution; and mixing the solution and the reaction liquid in the presence of an additive represented by the General Formula (1) below.

wherein m is an integer higher than 14 and lower than 18, n is an integer equal to or higher than 15 and equal to or lower than 25.

In one embodiment of a method for manufacturing the pigment dispersion in accordance with the present invention, the pigment is precipitated from the solvent in which the pigment has been dissolved, and the precipitated pigment is dispersed in a dispersion medium.

In another embodiment of the invention, after the additive represented by the General Formula (1) above has been added to the solution in which the pigment is dissolved in an organic acid, precipitation and dispersion of the pigment is performed by mixing the solution and the reaction liquid in a mixing region.

In one version of the invention, the pigment comprises a quinacridone pigment.

In yet another version of the invention, at least one of the solution in which the pigment is dissolved in an organic acid and the reaction liquid is supplied from a microchannel.

In a further version of the invention, both the solution in which the pigment is dissolved in an organic acid and the reaction liquid are supplied from microchannels. The mixing region may be a region, such as an open space, in which the liquids ejected from microchannels contact with each other.

In yet another version of the invention, a width inside at least one, and even all, of the microchannels may be equal to or larger than 50 μm and equal to or smaller than 3000 μm. In one version of the invention, the organic acid comprises an organosulfonic acid.

Basic features and aspects of the present invention are described above. Exemplary details and operation thereof will be explained in more detail below with reference to representative examples thereof.

In one embodiment, the present invention provides a method for manufacturing a pigment dispersion in which a pigment is dispersed by precipitating a pigment from a solution in which the pigment is dissolved and dispersing the pigment in a dispersion medium by using an additive.

The type of pigment used in accordance with the present invention is not particularly limited, and any well-known pigment can be used, provided that it can be at least partially dissolved in an organic acid. In one version, the pigment comprises an organic pigment.

Examples of suitable pigments include, but are not limited to, phthalocyanine pigments and derivatives thereof such as non-metallic phthalocyanines, copper phthalocyanine and derivatives thereof, halogenated copper phthalocyanines, and titanium phthalocyanine;

azo pigments such as insoluble azo pigments, condensation azo pigments; azo lake, and chelate azo pigments;

quinacridone pigments;

isoindolinone pigments;

indanthrone pigments;

diketopyrrolopyrrole pigments;

dioxazine pigments;

perylene pigments;

perinone pigments; and anthraquinone pigments. The amount of the pigment used is not particularly limited.

Commercial pigments may also be used as the aforementioned pigments. Examples of the commercial pigments are presented below.

Cyan pigments: C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22, and C.I. Pigment Blue-60.

Magenta or red pigments: C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-123, C.I. Pigment Red-146, C.I. Pigment Red-168, 184, C.I. Pigment Red-210, C.I. Pigment Red-242, C.I. Pigment Red-253, C.I. Pigment Red-254, and C.I. Pigment Red-256.

Green pigments: C.I. Pigment Green-7 and C.I. Pigment Green-36.

In one embodiment, the method for manufacturing a pigment dispersion in accordance with the present invention comprises a method for manufacturing a quinacridone pigment dispersion, where the quinacridone pigment has a structure represented by a General Formula (2) below:

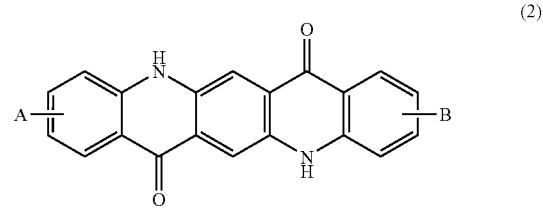

wherein A and B each individually represent a hydrogen atom, an alkyl group, or a halogen atom.

Examples of quinacridone pigments used in accordance with the present invention include, but are not limited to, non-substituted quinacridone, dimethylquinacridone and dihalogenated quinacridone.

These are C.I. Pigment Violet 19, C.I. Pigment Red 122, C.I. Pigment Red 202, C.I. Pigment Red 207, and C.I. Pigment Red 209.

These pigments may be used individually or in combinations of two or more thereof.

In one embodiment, a method for manufacturing a pigment dispersion in accordance with the present invention includes preparing a solution in which a pigment is dissolved in an organic acid. Because the pigments typically have high solubility in acids, a solution in which the pigment is dissolved to a high concentration can be prepared. Further, when an inorganic acid such as concentrated sulfuric acid is used, where a nonionic surfactant is added, the nonionic surfactant may be easily dissolved.

Pigments also often show solubility in organic acids that is sufficient to dissolve the pigments. In such a case, even when a nonionic surfactant is added, the nonionic surfactant may be difficult to dissolve. In particular, where a nonionic surfactant is added under low-temperature conditions, the dissolution thereof may be avoided.

The resultant effect is that the selection range of nonionic surfactants that can be used is expanded.

Examples of organic acids that can be used in accordance with the present invention include, but are not limited to, alkylsulfonic acids such as methanesulfonic acid, ethanesulfonic acid, propanesulfonic acid, and butanesulfonic acid, and halogenated alkylsulfonic acids obtained from the aforementioned acids by substitution with halogens, p-toluenesulfonic acid, 2-naphthalenesulfonic acid, p-chlorobenzenesulfonic acid, p-xylene-2-sulfonic acid, trifluoroacetic acid, and trifluoromethanesulfonic acid.

These acids may be used individually or in combinations of two or more thereof.

For organic acids that are solids at normal temperature, the dissolution may be performed by heating to a temperature equal to or higher than the melting point thereof. The dissolution of pigments may in general be performed at normal temperatures or under heating.

In one version, flowability of the solution may be increased by adding a solvent to the organic acid.

Examples of solvents suitable for the present invention include, but are not limited to, dimethylsulfoxide, dimethylimidazolidinone, sulfolan, N-methylpyrrolidone, dimethylformamide, γ-butyrolacone, acetic acid, and acetonitrile.

These solvents may be used individually or in combinations of two or more thereof.

In one embodiment of the method for manufacturing a pigment dispersion in accordance with the present invention, an additive comprising a nonionic surfactant represented by the General Formula (1) below is added to a solution in which a pigment is dissolved in an organic acid

$$C_mH_{2m+1}(OCH_2CH_2)_nOH \quad (1)$$

wherein m is an integer higher than 14 and lower than 18, n is an integer equal to or higher than 15 and equal to or lower than 25.

The nonionic surfactant represented by the General Formula (1) above is called a polyoxyethylene alkyl ether. It is a surfactant that typically does not dissociate into ions when dissolved in water and thus can act as a dispersant in a wide pH range.

In one version, by precipitating the pigment in the co-presence of a dispersant, dispersivity may be imparted by the dispersant to the pigment before the pigment can grow into coarse particles. Therefore, a dispersion with a reduced particle size can be obtained.

The nonionic surfactant can be added, for example, as is or upon dilution in a solvent.

In one embodiment, an organic acid can be used as the solvent for diluting the nonionic surfactant. Examples of suitable solvents include, but are not limited to alkylsulfonic acids such as methanesulfonic acid, ethanesulfonic acid, propanesulfonic acid, and butanesulfonic acid, and halogenated alkylsulfonic acids obtained from the aforementioned acids by substitution with halogens, p-toluenesulfonic acid, 2-naphthalenesulfonic acid, p-chlorobenzenesulfonic acid, p-xylene-2-sulfonic acid, trifluoroacetic acid, and trifluoromethanesulfonic acid. These acids may be used individually or in combinations of two or more thereof.

Examples of suitable solvents other than the organic acids include, but are not limited to, dimethylsulfoxide, dimethylimidazolidinone, sulfolan, N-methylpyrrolidone, dimethylformamide, γ-butyrolacone, acetic acid, and acetonitrile. These solvents may be used individually or in combinations of two or more thereof.

In one embodiment, the addition of the nonionic surfactant as an additive may be performed after the step of preparing a solution in which a pigment is dissolved in an organic acid, but the pigment may be also dissolved in an organic acid after the nonionic surfactant has been added.

In another embodiment, heating may be performed during dissolution of the pigment in an organic acid, and the nonionic surfactant may be added after the solution in which the pigment is dissolved in an organic acid has been prepared.

This is because heating in the presence of an organic acid can decompose the nonionic surfactant.

Where the nonionic surfactant used is not decomposed by heating in the presence of an organic acid, the pigment may be dissolved in the organic acid after the nonionic surfactant has been added.

The nonionic surfactant used in accordance with the present invention is represented by the General Formula (1) above, wherein m is in an alkyl chain ($C_mH_{2m+1}$), which is a hydrophobic unit, and m is higher than 14 and lower than 18 (14<m<18), such as 15 or 16.

Further, n is in a polyoxyethylene chain (($OCH_2CH_2)_n$), which is a hydrophilic unit, and n may be equal to or higher than 15 and equal to or lower than 25 ($15 \leq n \leq 25$), such as equal to or higher than 17 and equal to or lower than 23.

In accordance with one embodiment of the present invention, by using the nonionic surfactant with m and n within the above-described ranges, it is possible to produce a high-concentration pigment dispersion with a small particle size in the process of producing the pigment dispersion.

In one version, in precipitation of the pigment caused by mixing with a reaction liquid having a high-concentration water-soluble solvent under acidic conditions created by an organic acid, the hydrophobic units of the nonionic surfactant may be rapidly adsorbed on the hydrophobic pigment surface.

On the other hand, hydrophilic units of the nonionic surfactant function as a part of the dispersion process due to affinity for the water-soluble solvent. However, when precipitation is performed in a state with a relatively high pigment concentration in the production of a pigment dispersion, particles may easily grow and may also easily aggregate due the small distance between the organic molecules.

The inventors have discovered that reduced aggregation of pigment particles may be achieved by using the nonionic surfactant with m and n within optimum ranges.

In accordance with one aspect of the present invention, when the value n of hydrophilic units of the nonionic surfactant is relatively high, the molecular chain length increases accordingly, and the chain may intertwine with neighboring other nonionic surfactants and aggregation may occur in the pigment dispersion.

When n is relatively small, the number of hydrophilic units is reduced. Therefore, affinity for a water-soluble solvent decreases and aggregation may be induced. These effects can be inhibited by using the nonionic surfactant in which n in the polyoxyethylene chain $((OCH_2CH_2)_n)$ in accordance with the present invention is equal to or higher than 15 and equal to or lower than 25.

On the other hand, when the value m is relatively high, the molecular chain of hydrophobic units becomes relatively long, then mobility in the fluid during pigment precipitation may decrease, the rate of adsorption on the pigment surface that occurs during pigment precipitation is decreased, pigment particles may grow, and the particle size of the pigment itself may be increased.

Where the molecular chain is relatively long, a plurality of pigment particles may be adsorbed on the molecular chain and an aggregated state may occur. Further, when m is relatively low, the adsorption ability on the pigment surface is reduced and, therefore, stable dispersing may be more difficult to perform.

The investigation performed by the inventors demonstrated that these effects can be inhibited by using the nonionic surfactant in which m in the alkyl chain $(C_mH_{2m+1})$ in accordance with the present invention is higher than 14 and lower than 18.

In accordance with one aspect of the present invention, the amount of the nonionic surfactant added as an additive is obtained by multiplying the pigment weight by a factor of equal to or higher than 0.1 and equal to or lower than 10, such as equal to or higher than 0.1 to equal to or lower than 6.

When the factor is less than 0.1, a dispersion with a small particle size may be difficult to obtain and the dispersion stability may be adversely affected. Where the factor is more than 10, the viscosity of dispersion may increase, which may be undesirable from the standpoint of handleability.

In one embodiment, the method for manufacturing a pigment dispersion in accordance with the present invention includes preparing a reaction liquid comprising a water-soluble solvent. A solvent that is capable of decreasing the solubility and causing precipitation of the pigment dissolved in a solution comprising an organic acid may be used as the water-soluble solvent.

In such a case, the solubility of the pigment dissolved in a solution comprising an organic acid may decrease and the pigment can precipitate.

Examples of water-soluble solvents that can be used in accordance with the present invention include, but are not limited to, water, dimethylsulfoxide, dimethylimidazolidinone, sulfolan, N-methylpyrrolidone, dimethylformamide, γ-butyrolactone, acetone, and acetonitrile.

These solvents may be used individually or in combinations of two or more thereof.

In one version, a surfactant may be added to these water-soluble solvents. The surfactant may improve dispersion stability and adjust viscosity.

In one embodiment, the amount of the surfactant suitable for use may be obtained by multiplying the weight of the water-soluble solvent by a factor of equal to or higher than 0.01 to equal to or lower than 3, such as equal to or higher than 0.1 to equal to or lower than 1.

In one version, at least one of anionic, nonionic, cationic, and amphoteric surfactants can be used.

Examples of suitable anionic surfactants can include, but are not limited to, fatty acid salts, alkylsulfuric acid ester salts, alkylarylsulfonic acid salts, alkyldiarylether disulfonic acid salts, dialkylsulfosuccinic acid salts, alkylphosphoric acid salts, naphtalenesulfonic acid formalin condensate, polyoxyethylene alkylphosphoric acid ester salts and glycerol borate fatty acid esters.

Examples of nonionic surfactants can include, but are not limited to, polyoxyethylene alkyl ethers, polyoxyethylene polyoxypropylene block copolymer, sorbitan fatty acid esters, glycerin fatty acid esters, polyoxyethylene fatty acid esters, and polyoxyethylene alkylamines.

Examples of cationic surfactants can include, but are not limited to, alkylamine salts, quaternary ammonium salts, alkylpyridinium salts, and alkylimidazolium salts.

Examples of amphoteric surfactants can include, but are not limited to, alkylbetaines, alkylamineoxides, and phosphadylcholine.

Amphiphilic block copolymers also can be used, and the list above is furthermore not intended to be limiting.

Furthermore, the pH of the pigment dispersion produced may be adjusted by, for example, adding an acid or an alkali to the water-soluble solvent of the reaction liquid.

Accordingly, in one embodiment of a method for manufacturing a pigment dispersion in accordance with the present invention, the solution in which the pigment is dissolved in an organic acid is mixed with the reaction liquid in a mixing region, and precipitation and dispersion of the pigment are performed.

By using an organic acid for a solution in which a pigment is dispersed in an organic acid, the pigment may be dissolved to a high concentration. Therefore, the concentration of the pigment in the pigment dispersion obtained by mixing with the reaction liquid can be increased.

Thus, in one embodiment, the amount of solvent used can be reduced and subsequent concentration time and purification time can be shortened, thereby reducing the cost.

In one version, a conventional apparatus suitable for stirring, mixing, dispersing, and precipitating, such as for example an ultrasonic oscillator, a full-zone stirring impeller, a stirring apparatus of an internal circulation type, a stirring apparatus of an external circulation type, and an ion concentration control apparatus, can be used as the mixing region. A region may be provided in which liquids discharged from microchannels can be mixed in an open space (for example, in a space exposed to air).

In one embodiment of the method for manufacturing a pigment dispersion in accordance with the present invention, at least one of, and even both of the reaction liquid and the solution in which the pigment is dissolved in an organic acid can be supplied into the mixing region from microchannels.

As a result, the pigment dispersion can be manufactured, and the flow rate of either or both of the fluids can be adjusted.

In one version, the dispersion process can be also carried out while performing heating to increase flowability of the solution in which the pigment is dissolved in an organic acid. In yet another version, the dispersion process can be carried out at a temperature at which the dispersant substantially, and even entirely, does not dissolve.

In the version where the two fluids are supplied from microchannels and mixed with each other by a method illustrated by FIG. 1, the two fluids can be mixed together with substantially the same timing, thereby increasing the orderliness of the process and obtaining a uniform particle size of the dispersion.

Furthermore, because the absolute amounts of fluids supplied from the microchannels (including the case in which liquids are supplied from the microchannels) are typically small, rapid mixing can be performed and a small particle size can be relatively easily obtained.

In one embodiment, a small particle size can be relatively easily obtained when rapid mixing is performed because a large number of nuclei are generated by instantaneous mixing and, therefore, a large number of particles can grow, thereby providing smooth crystallization (particle formation) and formation of particles with a small primary particle size.

From the standpoint of mixing efficiency, in one embodiment a width of an opening of the microchannels used for supplying fluids to the reaction region may be equal to or less than 3000 μm, such as equal to or less than 1000 μm, and even equal to or less than 500 μm, such as equal to or less than 100 μm.

Furthermore, from the standpoint of facilitating the outflow from the microchannels and the viscosity of fluids, in one embodiment the width of the opening may be equal to or larger than 10 μm, such as equal to or larger than 50 μm. The width of the opening as referred to herein indicates the shortest side inside the opening.

For example, in the case of a rectangular opening shape of 100 μm×1 cm, the width referred to corresponds to the shortest side, which is 100 μm. As another example, in the case of a circular opening shape, the width referred to corresponds to the opening diameter.

Generally, the smaller the opening size, the smaller the width of the fluid flow supplied into the reaction region, which can allow mixing to be performed with good efficiency.

On the other hand, where the opening size is large, the flow width increases and mixing efficiency may drop. However, where a reaction liquid having a high viscosity is used, if a small opening is employed, the pressure loss may increase and the liquid sometimes cannot be discharged. Therefore, the opening size may be selected according to the reaction liquid employed.

The opening cross section may have a round, elliptical, polygonal, e.g. square, or rectangular shape.

Accordingly, in one embodiment of a method for manufacturing a pigment dispersion in accordance with the present invention, the mixing region is a microchannel.

In one version, a microreactor may be used to provide the microchannel used as the mixing region.

The term microreactor is a general term for reaction and mixing devices having a plurality of microscale flow channels.

For details, see, for example, "Microreactors, New Technology for Modern Chemistry" (Wolfgang Ehrfeld, Volker Hessel, Holger Loewe, WILEY-VCH, published in 2000).

The flow channels of microreactors are on a microscale from several microns to several hundreds of microns or several thousands of microns, and because the size is small and the flow velocity of the fluid flowing in the flow channel is also relatively small, the Reynolds number is also typically small.

The Reynolds number as referred to herein is a ratio of a force of inertia to a viscous force and serves as an index that is generally used to distinguish a laminar flow from a turbulent flow. Typically, where the Reynolds number exceeds 1000, an unstable laminar flow is obtained, and when the Reynolds number is more than 2000, the flow obtained is called a turbulent flow.

A fluid flowing inside a microscale flow channel may flow mainly as a laminar flow rather than as a turbulent flow in a typical reaction device.

When the flow is mainly a laminar flow, even when the flows of two liquids come into contact with each other, diffusion via the interface is typically a dominant process. Further, because surface area per unit volume is large in a microscale space, such a space is considered to be very useful for diffusion and mixing at the interface where laminar flows of two liquids come into contact.

According to the Fick law, the time that may be required for mixing is proportional to the second power of the diffusion distance. Thus, in the mixing implemented by molecular diffusion, the smaller the flow channel width, the shorter the mixing time. More specifically, where the flow channel width decreases by a factor of 10, the mixing time shortens by a factor of 100.

Therefore, the flow channel width of a mixing flow channel where a plurality of fluids are mixed by bringing them into contact with each other may be equal to or smaller than 3000 μm, such as equal to or smaller than 500 μm, and even equal to or smaller than 200 μm, such as equal to or smaller than 100 μm.

Taking into consideration limitations placed by the flow channel manufacturing process and the particle size of the dispersion obtained, the lower limit of the flow channel width may be about 30 μm. As the flow channel width decreases, the diffusion distance typically shortens. As a result, the mixing time may be shortened and the reaction time may be reduced.

EXAMPLES

The present invention will be specifically described below with reference to the Examples, but the present invention is not limited to these examples.

Example 1

In the present example, 2,9-dimethylquinacridone is used as a pigment. A total of 10 parts by weight of 2,9-dimethylquinacridone is placed in a pear-shaped flask with a capacity of 300 mL, and 80 parts by weight of methanesulfonic acid is added thereto under normal temperature. The pear-shaped flask is immersed in oil bath heated to 80° C., and heating and stirring are performed for 10 min under an argon gas atmosphere. The 2,9-dimethylquinacridone is dissolved and a quinacridone pigment solution of a blue-violet color is prepared.

A solution obtained by dissolving 6.86 parts by weight of polyoxyethylene cetyl ether ($C_{16}H_{33}(OCH_2CH_2)_{20}OH$) in 30 parts by weight of acetonitrile is added as a nonionic surfactant to 50 mL of the quinacridone pigment solution, and a solution in which the pigment is dissolved in an organic acid is prepared.

An aqueous solution of polyoxyethylene lauryl ether ($C_{12}H_{25}(OCH_2CH_2)_{41}OH$) with a concentration of 1 wt. % is used as a reaction liquid.

A microchannel 2 such as shown in FIG. 1 is used to supply the solution to a mixing region 1.

The microchannel 2 for supplying the solution in which the pigment is dissolved in an organic aid to the mixing region 1 is formed from a round pipe made from TEFLON® (a synthetic resinous fluorine-containing polymer). The size of an opening 3 thereof is 250 μm (diameter). The solution is supplied to the mixing region at a flow rate of 5 mL/min by using a syringe pump.

Another microchannel is formed from a round pipe made of TEFLON®. The size of the opening 3 thereof is 250 μm (diameter). The fluid is supplied to the mixing region at a flow rate of 8 mL/min by using a syringe pump.

The solution in which the pigment is dissolved in an organic acid and the reaction liquid merge in the mixing region 1 provided in the air (open space), where particles of 2,9-dimethylquinacridone are instantaneously generated and dispersed, and a dispersion of a magenta color is obtained at a high concentration.

The dispersion obtained is purified and concentrated by ultrafiltration. Because the original dispersion is obtained at a high concentration, the process is completed within a short time.

The results obtained in measuring the average particle size of fine pigment particles by DLS-8000 (Otsuka Denshi) demonstrate that the dispersion has a very uniform particle size and the average particle size is 90 nm.

The quinacridone pigment obtained shows no sedimentation even when allowed to stay for 10 days.

The quinacridone pigment obtained is used as a colorant pigment (C.I. Pigment Red-122), and the dispersion thereof is used as an ink for ink jet printing.

When the ink is loaded into an ink tank of a BJ Printer BJ F900 (Canon Inc.) and printed on usual paper, excellent text is obtained.

In one aspect of the example, a method for low-cost manufacturing of a high-concentration pigment dispersion dispersed to a small particle size can be provided. In yet another aspect according to the example, a pigment dispersion can be produced at a high concentration, the amount of solvent can be decreased, and the production cost may be reduced. In a further aspect, by using a method for manufacturing a pigment dispersion in accordance with the example, it may be possible to obtain a pigment dispersion useful as a colorant dispersed to a small particle size. Therefore, a pigment dispersion with good coloration ability can be obtained.

Comparative Example 1

The operations are performed in the same manner as in Example 1, except that polyoxyethylene lauryl ether ($C_{12}H_{25}(OCH_2CH_2)_{41}OH$) (n=41) is used as a nonionic surfactant that is added to the solution in which the pigment is dissolved in an organic acid.

The dispersion obtained is purified and concentrated by ultrafiltration. The results obtained in measuring the average particle size of fine pigment particles by DLS-8000 (Otsuka Denshi) demonstrate that the particle size distribution of the dispersion has a large width and the average particle size is 160 nm.

When the quinacridone pigment obtained is allowed to stay for 10 days, sedimentation is confirmed such that the sediment can be visually observed.

Example 2

In this example, unsubstituted quinacridone is used as a pigment.

A total of 10 parts by weight of the unsubstituted quinacridone is introduced in a pear-shaped flask with a capacity of 300 mL, and 60 parts by weight of methanesulfonic acid and 30 parts by weight of trifluoroacetic acid are added thereto at normal temperature.

The pear-shaped flask is immersed in oil bath heated to 45° C., and heating and stirring are performed for 10 min under an argon gas atmosphere. The unsubstituted quinacridone is dissolved and a quinacridone pigment solution of a blue-violet color is prepared.

A solution obtained by dissolving 6.86 parts by weight of polyoxyethylene cetyl ether ($C_{16}H_{33}(OCH_2CH_2)_{15}OH$) in 30 parts by weight of acetonitrile is added as a nonionic surfactant to 50 mL of the quinacridone pigment solution, and a solution in which the pigment is dissolved in an organic acid is prepared.

An aqueous solution of polyoxyethylene lauryl ether ($C_{12}H_{25}(OCH_2CH_2)_{41}OH$) with a concentration of 1 wt. % is used as a reaction liquid.

A triangular flask is used as a mixing region. A total of 80 mL of the reaction liquid is added to the triangular flask and stirring is performed with a mechanical stirrer.

A microchannel is used to supply the solution in which the pigment is dissolved in an organic acid into the mixing region. The microchannel 2 for supplying the solution in which the pigment is dissolved in an organic acid to the mixing region 1 is formed from a round pipe made from TEFLON®. The size of an opening 3 thereof is 170 μm (diameter).

The solution is supplied to the mixing region at a flow rate of 3 mL/min by using a syringe pump. Inside the triangular flask, particles of unsubstituted quinacridone are instantaneously generated and dispersed, and a dispersion of a red-violet color is obtained at a high concentration.

The dispersion obtained is purified and concentrated by ultrafiltration. Because the original dispersion is obtained at a high concentration, the process is completed within a short time. The results obtained in measuring the average particle size of fine pigment particles by DLS-8000 (Otsuka Denshi) demonstrate that the average particle size of the dispersion is 100 nm.

The quinacridone pigment obtained is used as a colorant pigment (C.I. Pigment Violet 19), and the dispersion thereof is used as an ink for ink jet printing.

When the ink is loaded into an ink tank of a BJ Printer BJ F900 (Canon Inc.) and printed on usual paper, excellent text is obtained.

Example 3

In this example, 2,9-dimethylquinacridone is used as a pigment.

A total of 10 parts by weight of the 2,9-dimethylquinacridone is introduced in a pear-shaped flask with a capacity of 100 mL, and 80 parts by weight of methanesulfonic acid is added thereto at normal temperature.

The pear-shaped flask is immersed in oil bath heated to 80° C., and heating and stirring are performed for 10 min under an argon gas atmosphere. The 2,9-dimethylquinacridone is dissolved and a quinacridone pigment solution of a blue-violet color is prepared.

A solution obtained by dissolving 6.86 parts by weight of polyoxyethylene cetyl ether ($C_{16}H_{33}(OCH_2CH_2)_{25}OH$) in 25 parts by weight of acetonitrile and 5 parts by weight of acetic acid is added as a nonionic surfactant to 50 mL of the quinacridone pigment solution, and a solution in which the pigment is dissolved in an organic acid is prepared.

An aqueous solution of polyoxyethylene lauryl ether ($C_{12}H_{25}(OCH_2CH_2)_{41}OH$) with a concentration of 1 wt. % is used as a reaction liquid.

Figure 2:
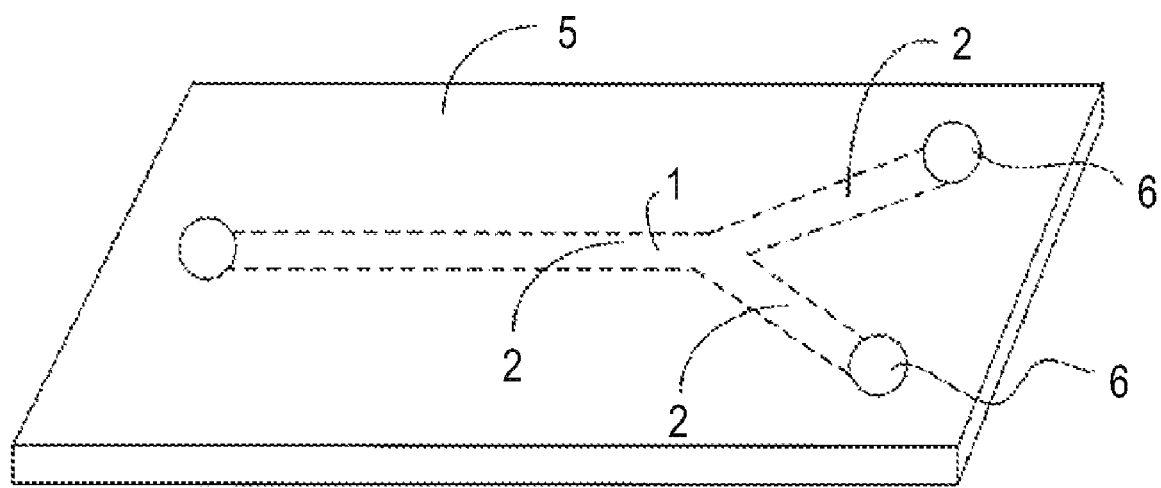
FIG. 2 shows schematically a microreactor that can be used in Example 3 of the present invention.

A microreactor 5 such as shown in FIG. 2 in which two liquids can be mixed is used as a mixing region.

The flow channel width of the mixing region 1 in the microreactor is 300 μm and the depth is 200 μm.

The solution in which the pigment is dissolved in an organic acid is supplied from a supply port 6 of the microreactor 5 at a flow rate of 3 mL/min.

The reaction liquid is supplied from another supply port 6 at a flow rate of 4.8 mL/min. The two reaction liquids merge in the mixing region 1 provided in the air, particles of 2,9-dimethylquinacridone are instantaneously generated and dispersed, and a dispersion of a magenta color is obtained at a high concentration.

The dispersion obtained is purified and concentrated by ultrafiltration. Because the original dispersion is obtained at a relatively high concentration, the process is completed within a short time.

The results obtained in measuring the average particle size of fine pigment particles by DLS-8000 (Otsuka Denshi) demonstrate that the dispersion has a very uniform particle size and the average particle size of the dispersion is 95 nm.

The quinacridone pigment obtained is used as a colorant pigment (C.I. Pigment Red-122), and the dispersion thereof is used as an ink for ink jet printing.

When the ink is loaded into an ink tank of a BJ Printer BJ F900 (Canon Inc.) and printed on usual paper, excellent text is obtained.

Comparative Example 2

The operations are performed in the same manner as in Example 3, except that polyoxyethylene lauryl ether ($C_{12}H_{25}(OCH_2CH_2)_{25}OH$) (m=12) is used as a nonionic surfactant that is added to the solution in which the pigment is dissolved in an organic acid. The dispersion obtained is purified and concentrated by ultrafiltration.

The results obtained in measuring the average particle size of fine pigment particles by DLS-8000 (Otsuka Denshi) demonstrate that the particle size distribution of the dispersion has a large width and the average particle size is 160 nm. When the quinacridone pigment obtained is allowed to stay for 10 days, sedimentation is confirmed such that the sediment can be visually observed.

Example 4

In this example, copper phthalocyanine is used as a pigment. A total of 10 parts by weight of the copper phthalocyanine is introduced in a pear-shaped flask with a capacity of 300 mL, and 80 parts by weight of methanesulfonic acid is added thereto at normal temperature.

The pear-shaped flask is immersed in oil bath heated to 80° C., and heating and stirring are performed for 10 min under an argon gas atmosphere. The copper phthalocyanine is dissolved and a copper phthalocyanine pigment solution of a deep green color is prepared.

A solution obtained by dissolving 6.86 parts by weight of polyoxyethylene cetyl ether ($C_{16}H_{33}(OCH_2CH_2)_{20}OH$) in 30 parts by weight of acetonitrile is added as a nonionic surfactant to 50 mL of the copper phthalocyanine pigment solution, and a solution in which the pigment is dissolved in an organic acid is prepared.

An aqueous solution of polyoxyethylene lauryl ether ($C_{12}H_{25}(OCH_2CH_2)_{41}OH$) with a concentration of 1 wt. % is used as a reaction liquid.

A microchannel 2 such as shown in FIG. 1 is used to supply the solution to a mixing region.

The microchannel 2 for supplying the solution in which the pigment is dissolved in an organic aid to the mixing region 1 is formed from a round pipe made from TEFLON®. The size of an opening 3 thereof is 250 μm (diameter).

The solution is supplied to the mixing region at a flow rate of 5 mL/min by using a syringe pump. Another microchannel is formed from a round pipe made of TEFLON®. The size of the opening 3 thereof is 250 μm (diameter). The fluid is supplied to the mixing region at a flow rate of 8 mL/min by using a syringe pump.

These two reaction liquids merge in the mixing region 1 provided in the air, particles of copper phthalocyanine are instantaneously generated and dispersed, and a dispersion of a cyan color is obtained at a high concentration. The effect obtained is identical to that of Example 1.

The method for manufacturing a pigment dispersion in accordance with the present invention makes it possible to obtain a high-concentration pigment dispersion dispersed to a small particle size at a low cost. Therefore, the method is suitable for manufacturing colorants such as inks and toners.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-274315, filed Oct. 22, 2007, which is hereby incorporated by reference herein in its entirety.

What is claimed is:

1. A method for manufacturing a pigment dispersion, the method comprising:
   preparing a solution in which a pigment that is selected from the group consisting of a quinacridone compound and copper phthalocyanine is dissolved in an organic acid;
   preparing a reaction liquid capable of decreasing the solubility of the pigment in the solution; and
   mixing the solution and the reaction liquid in the presence of an additive represented by a General Formula (1) below, $$C_mH_{2m+1}(OCH_2CH_2)_nOH \quad (1)$$

wherein m is an integer higher than 14 and lower than 18, and n is an integer equal to or higher than 15 and equal to or lower than 25.

2. The method for manufacturing a pigment dispersion according to claim 1, wherein
   after the additive represented by the General Formula (1) above has been added to the solution in which the pigment is dissolved in an organic acid, precipitation and dispersion of the pigment are performed by mixing the solution and the reaction liquid in a mixing region.

3. The method for manufacturing a pigment dispersion according to claim 1, wherein at least one of the solution in which the pigment is dissolved in an organic acid and the reaction liquid is supplied from a microchannel.

4. The method for manufacturing a pigment dispersion according to claim 3, wherein both the solution in which the pigment is dissolved in an organic acid and the reaction liquid are supplied from microchannels.

5. The method for manufacturing a pigment dispersion according to claim 2, wherein the mixing region is an open space in which the liquids ejected from microchannels contact with each other.

6. The method for manufacturing a pigment dispersion according to claim 5, wherein a width inside at least one of the microchannels is equal to or larger than 10 μm and equal to or smaller than 3000 μm.

7. The method for manufacturing a pigment dispersion according to claim 1, wherein the organic acid comprises an organosulfonic acid.

8. The method for manufacturing a pigment dispersion according to claim 1, wherein the pigment is dissolved in the organic acid in the presence of the additive.

* * * * *